United States Patent
Viero et al.

(10) Patent No.: US 7,792,071 B2
(45) Date of Patent: Sep. 7, 2010

(54) DATA TRANSMISSION METHOD AND ARRANGEMENT

(75) Inventors: Timo Viero, Espoo (FI); Matti Kiiski, Oulunsalo (FI)

(73) Assignee: Nokia Corporation, Espoo (FI)

( * ) Notice: Subject to any disclaimer, the term of this patent is extended or adjusted under 35 U.S.C. 154(b) by 1214 days.

(21) Appl. No.: 10/519,481

(22) PCT Filed: Jul. 1, 2003

(86) PCT No.: PCT/FI03/00530
§ 371 (c)(1),
(2), (4) Date: Dec. 30, 2004

(87) PCT Pub. No.: WO2004/006451
PCT Pub. Date: Jan. 15, 2004

(65) Prior Publication Data
US 2005/0245266 A1  Nov. 3, 2005

(30) Foreign Application Priority Data
Jul. 3, 2002  (FI) .................................. 20021314

(51) Int. Cl.
*H04W 4/00* (2009.01)
*H04L 12/28* (2006.01)

(52) U.S. Cl. .................. 370/328; 370/255; 370/256

(58) Field of Classification Search ............ 370/328, 370/333, 437, 452, 254, 408, 255–256; 455/450, 455/451, 452.1, 452.2, 453, 561, 67.11, 226.11, 455/560, 226.1
See application file for complete search history.

(56) References Cited

U.S. PATENT DOCUMENTS

| 5,651,030 | A | 7/1997 | Wong et al. |
| 6,240,282 | B1 | 5/2001 | Kleider et al. |
| 6,385,585 | B1* | 5/2002 | Jonsson et al. ............... 704/275 |
| 6,573,757 | B1* | 6/2003 | Gallagher .................... 326/101 |
| 6,771,633 | B1* | 8/2004 | Mizoguchi ................... 370/345 |
| 6,956,832 | B1 | 10/2005 | Muhonen et al. ............ 370/310 |
| 2002/0167914 | A1* | 11/2002 | Haneda ........................ 370/255 |
| 2004/0106417 | A1* | 6/2004 | Schieder et al. ............. 455/466 |
| 2004/0224714 | A1* | 11/2004 | Posti ........................... 455/522 |

FOREIGN PATENT DOCUMENTS

JP  06-202882  7/1994

(Continued)

OTHER PUBLICATIONS

Chinese Official Action for Application No. 03815639.3, Date of Notification Feb. 9, 2007.

(Continued)

*Primary Examiner*—George Eng
*Assistant Examiner*—Brandon J Miller
(74) *Attorney, Agent, or Firm*—MIntz, Levin, Cohn, Ferris, Glovsky and Popeo, P.C.

(57) ABSTRACT

A circuit arrangement for signal processing in a receiver and/or transmitter of a radio system, wherein the circuit arrangement nodes are arranged to execute at least one operation. The circuit arrangement comprises means for dividing at least one of the signals or signal components according to the one or more predetermined division criteria for signal classes and the circuit arrangement comprises means for executing predetermined operations signal-classwise.

60 Claims, 4 Drawing Sheets

FOREIGN PATENT DOCUMENTS

| | | |
|---|---|---|
| JP | 07-287702 | 10/1995 |
| JP | 11-327919 | 11/1999 |
| JP | 2000-091985 | 3/2000 |
| JP | 2000-174728 | 6/2000 |
| JP | 2001-175619 | 6/2001 |
| JP | 2001-189711 | 7/2001 |
| JP | 2002-057792 | 2/2002 |
| KR | WO 01/37581 | 5/2001 |
| KR | 2000-71228 | 6/2002 |
| WO | WO 02/51044 | 6/2002 |

OTHER PUBLICATIONS

Japanese Office Action, Application No. 2004-518811, Dated: Nov. 16, 2007, pp. 1-4. English Translation of Office Action included: pp. 1-3.

Communication pursuant to Article 94(3) EPC dated Dec. 21, 2009, issued by the European Patent Office, in connection with counterpart European application No. 03735746.4-2411.

* cited by examiner

DATA TRANSMISSION METHOD AND ARRANGEMENT

FIELD

The invention relates to a method and a circuit arrangement for signal processing in a receiver and/or transmitter of a radio system.

BACKGROUND

Future radio systems will transmit signals of different types simultaneously and even on the same carrier wave. The signals may be, for instance, encrypted, modulated, power limited in various ways or they may belong to different quality classes. It is possible to send simultaneously speech, data and images, which are all processed both in the transmitter and in the receiver in various manners. A plurality of different radio system standards can be in simultaneous use, for instance, data packets, video image and speech each having one. A problem arises how a system, in which signals are processed in different manners, can be implemented in practice.

BRIEF DESCRIPTION

One aspect of the invention is a method for processing signals in a radio system receiver and/or transmitter. The method comprises first determining for different circuit arrangement nodes at least one operation to execute, second determining one or more division criteria for signal classes, dividing at least one of the signals or signal components according to the one or more division criteria for signal classes, executing the predetermined operations in the circuit arrangement nodes signal-classwise.

One aspect of the invention is a method for processing signals in a radio system receiver and/or transmitter. The method comprises first determining for different circuit arrangement nodes at least one operation to execute and selecting a modification level from the circuit arrangement, merging the selected modification level nodes and deleting irrelevant nodes and links between the nodes and/or adding new links, second determining one or more division criteria for signal classes for dividing the signals or signal components, dividing at least one of the signals or signal components according to the one or more division criteria for signal classes, executing the predetermined operations in the circuit arrangement nodes signal-classwise.

One aspect of the invention is a circuit arrangement for signal processing in a radio system receiver and/or transmitter, the circuit arrangement comprising: circuit arrangement nodes arranged to execute at least one operation, means for dividing at least one of the signals or signal components according to the one or more predetermined division criteria for signal classes, means for executing the predetermined operations signal-classwise.

The preferred embodiments of the invention are disclosed in the dependent claims.

The invention is based on the idea that signals or signal components are classified, according to need, into different signal classes and various operations are executed signal-classwise. Division criteria for signal classes include, for instance, a carrier wave, a modulation method or a need for power limitation.

An example of the advantages of the invention is that signal processing can be enhanced, in particular, in systems, which employ a plurality of radio standards, or in which signals have to be processed in various manners for other reasons.

LIST OF THE DRAWINGS

In the following, the preferred embodiments of the invention will be described by way of example with reference to the attached drawings, wherein.

DESCRIPTION OF THE EMBODIMENTS

Figure 1:
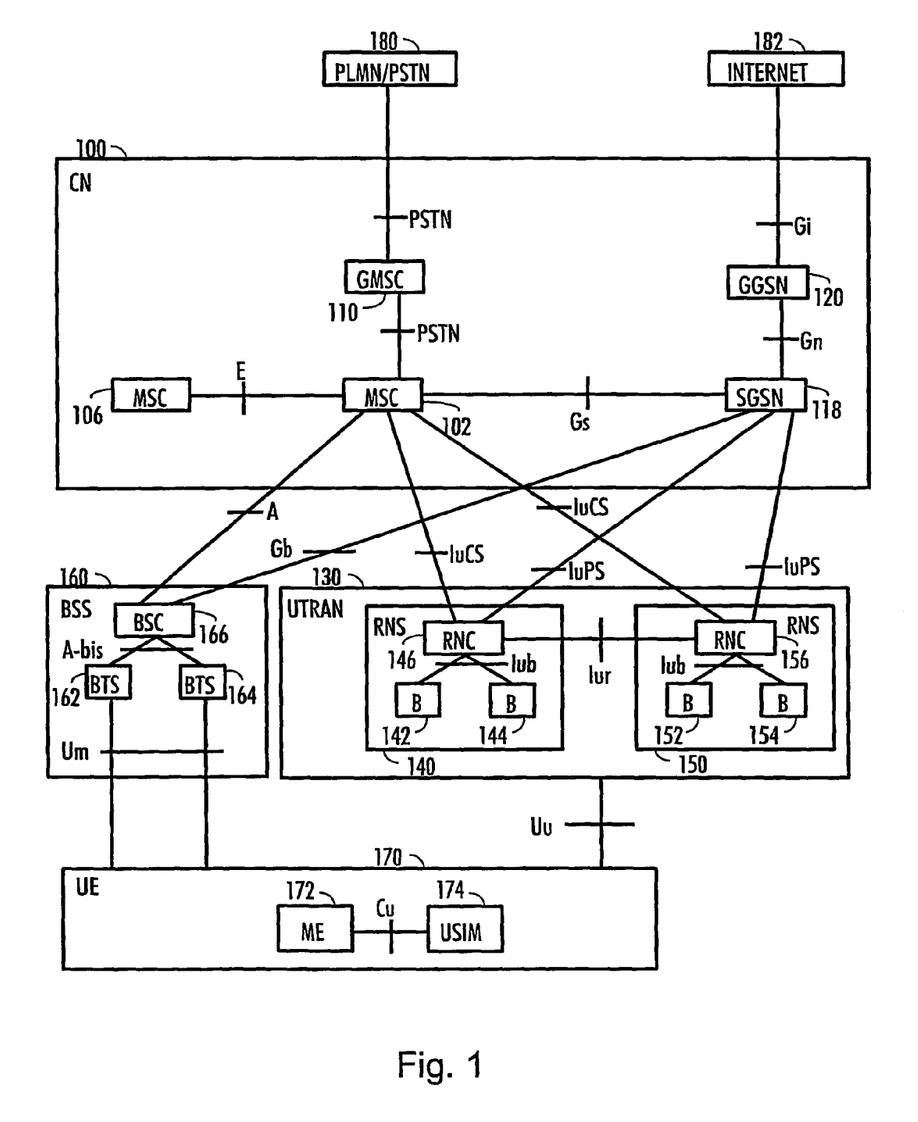
FIG. 1 is a simplified block diagram of the structure of a radio system.

Since the radio systems of the second and the third generations and their various hybrids, i.e. radio systems of the 2.5 generation, are in use worldwide and under constant development, in FIG. 1 the embodiments are described in a simplified radio system, which comprises network elements of different generations in parallel. In the description, the radio system of the second generation is represented by the GSM (Global System for Mobile Communications), the third generation radio system by a radio system which is based on the GSM, uses the EDGE technique (Enhanced Data Rates for Global Evolution) for increasing the data transmission rate, and can also be used for implementing packet transmission in the GPRS system (General Packet Radio System). Sometimes the EDGE system is seen as a 2.5 generation system. The third generation radio system is also represented by a radio system which is known at least by the names IMT-2000 (International Mobile Telecommunications 2000) and UMTS (Universal Mobile Telecommunications System). The embodiments are not, however, restricted to these systems given as examples but a person skilled in the art may apply the solution in other radio systems provided with the necessary properties.

FIG. 1 is a simplified block diagram, which describes the most important network elements of the radio system and the interfaces between them. The structure and function of the network elements are not described in detail because they are commonly known.

The main parts of the radio system are a core network (CN) 100, a radio access network 130 and user equipment (UE) 170. The term UTRAN is an abbreviation from UMTS Terrestrial Radio Access Network, i.e. the radio access network belongs to the third generation and is implemented by wideband code division multiple access WCDMA. FIG. 1 further illustrates a base station system 160, which belongs to the 2/2.5 generation and is implemented by time division multiple access TDMA.

Generally, the radio system can also be defined as follows: the radio system consists of a user terminal, which is also called a subscriber terminal or a mobile station, and of a network part, which includes the fixed infrastructure of the radio system, i.e. a core network, a radio access network and a base station system.

The structure of the core network 100 corresponds to a combined structure of the GSM and GPRS systems. The network elements of the GSM are responsible for implementing circuit-switched connections and the network elements of the GPRS are responsible for implementing packet-switched connections. However, some of the network elements are included in both systems.

A mobile services switching centre (MSC) 102 is the centre of the circuit-switched side of the core network 100. The same mobile services switching centre 102 can be used to serve the connections of both the radio access network 130 and the base station system 160. The tasks of the mobile services switching centre 102 typically include switching, paging, user terminal location registration, handover management, collection of subscriber billing information, data encryption parameter management, frequency allocation management and echo cancellation.

The number of mobile services switching centres 102 may vary: a small network operator may have only one mobile services switching centre 102, whereas large core networks 100 may have several ones. FIG. 1 shows another mobile services switching centre 106 but its connections to other network elements are not illustrated to keep FIG. 1 sufficiently clear.

Large core networks 100 may comprise a separate gateway mobile services switching centre (GMSC) 110, which is responsible for circuit-switched connections between the core network 100 and the external networks 180. The gateway mobile services switching centre 110 is located between the mobile services switching centres 102, 106 and the external networks 180. The external network 180 may be, for example, a public land mobile network PLMN or a public switched telephone network PSTN.

The core network 100 typically comprises other parts, too, such as a home location register HLR, which includes a permanent subscriber register and, if the radio system supports the GPRS, a PDP address (PDP=Packet Data Protocol), and a visitor location register VLR, which includes information on roaming of the user terminals 170 in the area of the mobile services switching centre 102. Not all parts of the core network are shown in FIG. 1 to keep it clear.

A serving GPRS support node (SGSN) 118 is the centre of the packet-switched side of the core network 100. The main task of the serving GPRS support node 118 is to transmit and receive packets with the user terminal 170 supporting packet-switched transmission, utilizing the radio access network 130 or the base station system 160. The serving GPRS support node 118 includes subscriber information and location information on the user terminal 170.

A gateway GPRS support node (GGSN) 120 on the packet-switched side corresponds to the gateway mobile services switching centre 110 on the circuit-switched side, with the exception that the gateway GPRS support node 120 has to be able to route outgoing traffic from the core network 100 to external networks 182, whereas the gateway mobile services switching centre 110 typically routes only the incoming traffic. In the example, the external networks 182 are represented by the Internet, via which a considerable part of wireless telephone traffic can be transmitted in the future.

The base station system 160 consists of a base station controller (BSC) 166 and base transceiver stations (BTS) 162, 164. The base station controller 166 controls the base transceiver stations 162, 164. In principle, the devices implementing the radio path and their functions should be located in the base transceiver station 162, 164 and the management devices in the base station controller 166. The implementation may naturally deviate from this principle.

The base station controller 166 is usually responsible for the following tasks, for example: management of the radio resources of the base transceiver station 162, 164, intercell handover, frequency management, i.e. allocation of frequencies to the base transceiver stations 162, 164, management of frequency hopping sequences, measurement of time delays on the uplink, implementation of the operation and maintenance interface, and management of power control.

The base station 162, 164 includes at least one transceiver which forms one carrier wave. In the GSM systems, one carrier wave usually comprises eight time slots, i.e. eight physical channels. One base station 162, 164 may serve one cell or several sectorized cells. The cell diameter may vary from a few meters to dozens of kilometers. The base station 162, 164 is often deemed to include a transcoder, too, for performing conversion between the speech coding format used in the radio system and the speech coding format used in the public switched telephone system. In practice the transcoder, however, is usually physically located in the mobile services switching centre 102. The base station 162, 164 is usually responsible for the following tasks, for example: calculation of a TA (timing advance), measurements on the uplink, channel coding, encryption, decryption and frequency hopping.

The radio access network 130 consists of radio network subsystems 140, 150. Each radio network subsystem 140, 150 consists of radio network controllers (RNC) 146, 156 and B nodes 142, 144, 152, 154. The B node is rather an abstract concept, which is frequently replaced by the term 'base station'.

Functionality the radio network controller 140, 150 roughly corresponds to the base station controller 166 of the GSM system and the B node 142, 144, 152, 154 to the base station 162, 164 of the GSM system. Solutions are also available where the same device serves both as the base station and as the B node, i.e. the device can simultaneously implement the TDMA and the WCDMA radio interface.

The user terminal 170 consists of two parts: mobile equipment (ME) 172 and a UMTS subscriber identity module (USIM) 174. In the GSM system the identity module of the system is naturally used. The user terminal 170 comprises at least one transceiver for establishing a radio connection to the radio access network 130 or to the base station system 160. The user terminal 170 may include at least two different subscriber identity modules. In addition, the user terminal 170 comprises an antenna, a user interface and a battery. Nowadays various kinds of user terminals 170 are available, e.g. vehicle-mounted and portable terminals. The user terminals 170 also have properties similar to those of a personal computer or a portable computer.

The USIM 174 includes information on the user and information on data security, e.g. an encryption algorithm, in particular.

In the following, the interfaces between different network elements shown in FIG. 1 are presented in Table 1. It is obvious to a person skilled in the art that the interfaces included in the radio telecommunications system are determined by the hardware implementation and the standard used, for which reason the interfaces of the system may differ from those shown in FIG. 1. In the UMTS, the most important interfaces are the Iu interface between the core network and the radio access network, which is divided into the IuCS (CS=Circuit Switched) interface of the circuit-switched side and the IuPS (PS=Packet Switched) interface of the packet-switched side, and the Uu interface between the radio access network and the user terminal. In the GSM, the most important interfaces are the A interface between the base station controller and the mobile services switching centre, the Gb interface between the base station controller and the serving GPRS support node, and the Um interface between the base station and the user terminal. The interface defines what kind of messages different network elements may use to communicate with one another. The object of the standardisation of interfaces is to enable function between network elements of different manufacturers. In practice, however, some of the interfaces are manufacturer-specific.

TABLE 1

| Interface | Between network elements |
| --- | --- |
| Uu | UE-UTRAN |
| Iu | UTRAN-CN |
| IuCS | UTRAN-MSC |
| IuPS | UTRAN-SGSN |
| Cu | ME-USIM |
| Iur | RNC-RNC |
| Iub | RNC-B |
| A | BSS-MSC |
| Gb | BSC-SGSN |
| A-bis | BSC-BTS |
| Um | BTS-UE |
| E | MSC-MSC |
| Gs | MSC-SGSN |
| PSTN | MSC-GMSC |
| PSTN | GMSC-PLMN/PSTN |
| Gn | SGSN-GGSN |
| Gi | GGSN-INTERNET |

Figure 2:
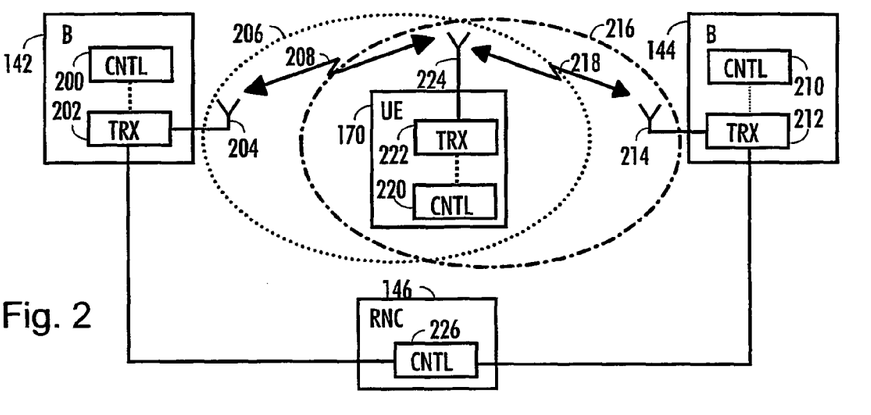
FIG. 2 is a simplified block diagram of the structure of WCDMA radio system.

In the following, a cellular WCDMA radio telecommunications system will be described by means of FIG. 2. FIG. 2 shows part of a simplified radio system, which comprises a subscriber terminal 170, two base stations 142, 144 and a base station controller 146. The first base station 142 comprises a transceiver 202, an antenna 204 and a control block 200. Like-wise, the second base station 144 comprises a transceiver 212, an antenna 214 and a control block 210. The base station controller 146 also comprises a control block 226. The user terminal 170 also comprises a normal transceiver 222 and an antenna for implementing a radio link and a control block 220. The transceivers 202, 212, 222 use the CDMA technology (Code Division Multiple Access). In the CDMA technology, i.e. in code division multiple access, radio resources are allocated to each user by means of user-specific codes. The technique is generally known, for which reason it will not be described in greater detail here. The antennas 204, 214, 224 can be implemented by common prior art solutions, e.g. as omnidirectional antennas or as antennas employing a directed antenna beam.

In the radio telecommunications system, the radio cells created by base stations usually overlap to some extent to provide extensive coverage. This is illustrated in FIG. 2 by a radio cell 206 created by the base station 142 and a radio cell 216 created by the base station 144. In the existing radio telecommunications systems, wireless telecommunications connections are established by user terminals and base stations which communicate with one another on a radio connection, i.e. calls or data transmission connections between different user terminals are established via base stations. This is illustrated in FIG. 2 by radio connections 208, 218. In particular, FIG. 2 shows a situation where a user terminal 170, which may be mobile, communicates over a radio connection with the first base station 142, simultaneously measuring common pilots of this base station 142 and the second base station 144 for a possible handover. In a typical situation the radio connection of the user terminal shifts to the carrier wave of the second base station when there is free capacity in the new cell and the new connection has a better quality. Channel and cell handovers enable continuity of the radio connection when the user terminal moves or the physical radio channel changes as a function of time.

The control blocks 200, 210, 220, 226 refer to a block which controls the operation of the device and which is nowadays usually implemented as a processor and its software, but various hardware solutions are also feasible, e.g. a circuit built from separate logic components or one or more application specific integrated circuits ASIC. A hybrid of these different implementations is also feasible. When selecting the implementation method, a person skilled in the art will consider the requirements set on the size and power consumption of the device, the necessary processing capacity, the production costs and the production volumes.

Further information on radio telecommunications systems is available in the literature and standards of the field.

Figure 3:
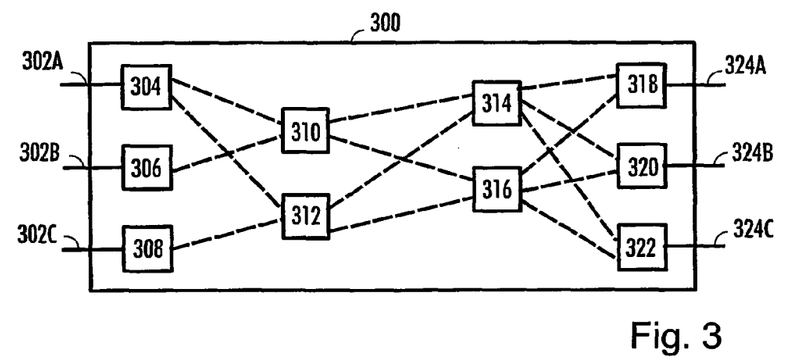
FIG. 3 is an example of a base station depicted by means of nodes.

With reference to FIG. 3, an example of a base station will be described by means of nodes. The base station 300 comprises input ports 302A, 302B, 302C, through which the base stations receives signals from other network elements, such as a radio network controller RNC, a serving GPRS support node SGSN or a gateway GPRS support node GGSN. The base station also comprises output ports 324A, 324B, 324C, through which signals are applied to an antenna unit to be transmitted on a radio path. The data to be transmitted to the base station can also be in the packet form. The data packets received by the base station are digital and baseband packets. The data packets typically include an address part and an actual payload part. There are several standards for packet-switched data, and they are not described in detail herein.

In the example of FIG. 3, the base station is assumed to consist of nodes 304 to 322 and links between them, which links are indicated by broken lines. The links between nodes can be either point-to-point links or buses. In practice, the bus structure is more common. The nodes can be divided into nodes that perform baseband processing and nodes that perform radio-frequency processing. The nodes can also be of some other type.

The nodes can be implemented as an application-specific integrated circuit (ASIC), a field programmable gate array (FPGA) or as combinations thereof.

The task of the base station is to transmit data onto a radio path and thereby to a subscriber terminal of the recipient. Hence, the data must be subjected to modification operations required by the radio interface standard, such as modulation and upmixing onto a radio frequency. The base station also receives from the subscriber terminals carrier-frequency data in the analogue format. Various modification operations, such as downmixing onto a baseband, are performed on the data received by the base station. The operations are typically executed in the nodes, which can also be called processing units, for instance.

Next will be described a method for signal processing in a radio system receiver and/or transmitter. To describe the method, the base station is assumed to consist of nodes, i.e. processing units, and links between them. The method processes either signals or signal components. The signal component refers, for instance, to an I-component or a Q-component of an I/Q modulated signal or a part of a summed signal.

Figure 4:
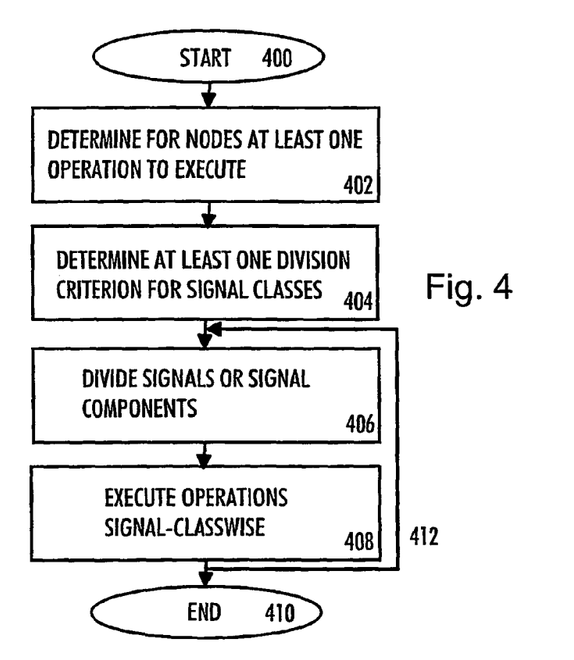
FIG. 4 is a flow chart.

The method starts in block 400. In block 402, at least one operation to be executed is determined for different nodes of the circuit arrangement. The nodes are typically divided into baseband nodes or radio-frequency nodes depending on the tasks assigned to the nodes: for instance, signal power amplification is performed in the radio-frequency parts, whereas signal frequency change, i.e. downmixing or upmixing, is performed in the baseband parts. The number of nodes, their tasks and links between nodes vary depending on the application. There are various solutions for the basic architecture, which include various tree and loop models. The tree model is a linked graph, which is not a circle. As the name indicates, the loop model comprises a loop, i.e. a ring, and in many cases it can also be regarded as a coupled tree model.

Figure 5:
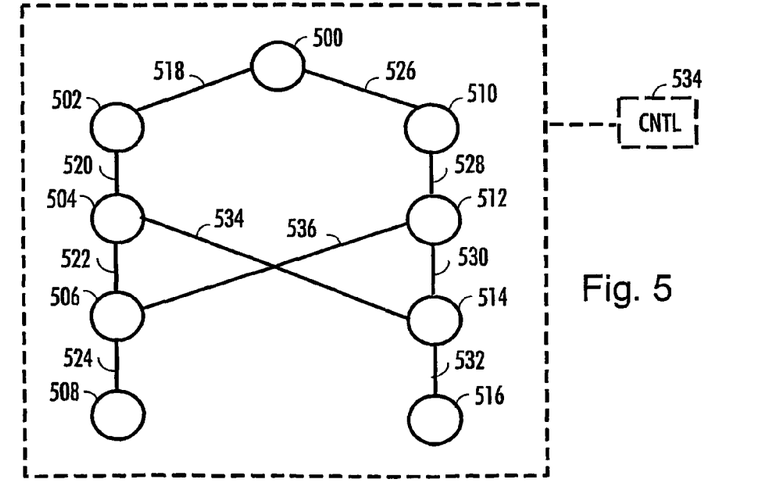
FIG. 5 is an example of tree architecture.

An advantageous architectural configuration applicable to the implementation of the invention is a combined tree structure. Naturally, the combined tree structure can be implemented in a variety of ways. An example of this structure is shown in FIG. 5. Nodes 502 to 508 constitute a first subtree and nodes 510 to 516 a second subtree. The number of subtrees may vary. Both subtrees are connected to a so-called zero node or root node 500. In a base station that is implemented by means of the combined subtree structure one branch often carries out transmitter tasks and the other branch, in turn, carries out receiver tasks. Nodes 504, 514, 506, 512 are data transfer nodes, through which desired information can be conveyed from one tree branch to the other, for instance information between the transmitter and the receiver, via links 534, 536. Other links between nodes are indicated by lines 518, 520, 522, 524, 526, 528, 530, 532.

Figure 6:
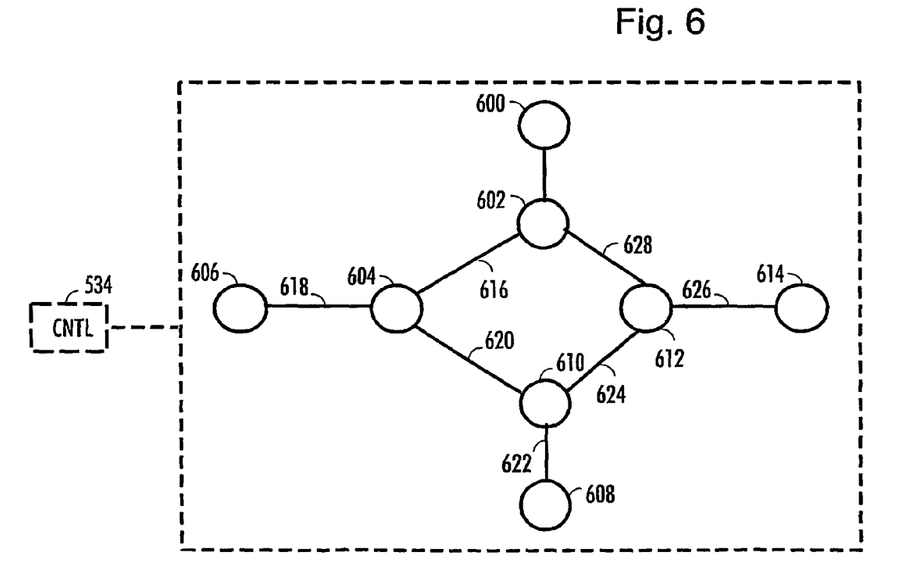
FIG. 6 is an example of loop architecture.

Another architectural configuration described in greater detail herein that is applicable to the implementation of the invention is a loop structure. The loop structures can be implemented in a variety of ways. An example of this structure is shown in FIG. 6. In a base station that is implemented by means of the centralized loop structure, at least two subtrees are typically connected to the loop, of which subtrees one carries out tasks of the radio-frequency parts and the other carries out tasks of the baseband parts. Thus, nodes 600, 606, for instance, carry out the tasks of the radio-frequency parts and nodes 608, 614 carry out the tasks of the baseband parts. Nodes 602, 604, 610, 612 are data transfer nodes and they take care of data transfer from one node to another. Links between nodes are indicated by lines 616, 618, 620, 622, 624, 626, 628.

A circuit arrangement can be implemented in a variety of ways, in addition to the tree model or the loop model, for instance by combining these two models in a suitable manner.

In a second preferred embodiment of the invention, the circuit arrangement is provided by modifying a simple architectural configuration, for instance, the tree model in a manner that enables the best-suited circuit arrangement, i.e. architectural, solution for each particular application. In the method from the circuit arrangement there is selected a modification level that is typically a sublevel. The selected modification level nodes are merged, whereafter irrelevant nodes and links are deleted between the nodes and/or new links are added. In this manner it is also possible to implement the above-described combined tree structure and loop structure.

Figure 7A:
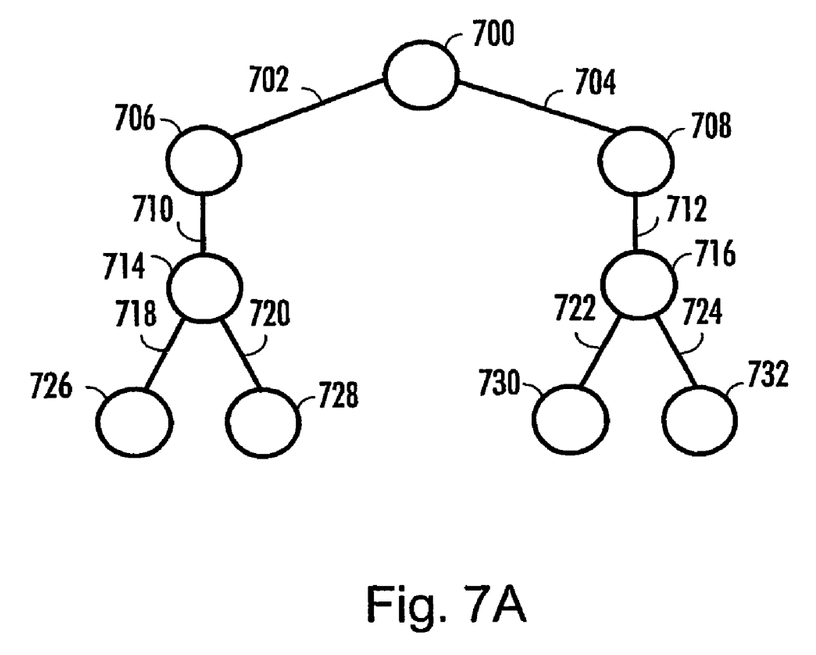
FIGS. 7A to 7B are examples of modification of the architectural structure.
Figure 7B:
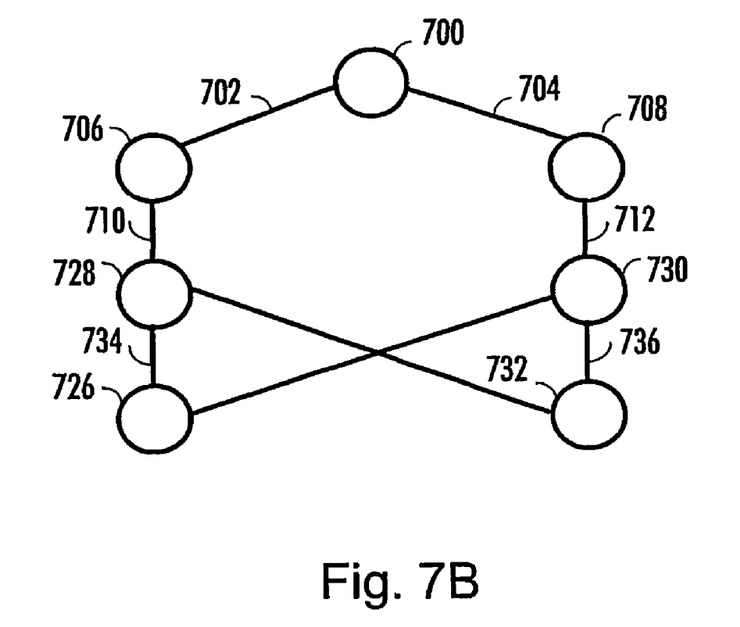

By means of FIGS. 7A to 7B the modification will be described in greater detail. FIG. 7A shows an example of a simple tree structure. Node 700 is a root node, nodes 706, 708 are first-level subnodes, nodes 714, 716 are second-level subnodes and nodes 726, 728, 730, 732 are third-level subnodes. The links between different nodes are indicated by lines 702, 704, 710, 712, 718, 720, 722, 724. The tree may also branch from the subnodes, as it can be seen from FIG. 7A: on the third level there are two nodes in each branch of the tree. The tree model is to be modified and a decision is made to select the third level as the modification level. An example of a modified model is shown in FIG. 7B. The selected modification level nodes are connected in pairs 726 and 730 as well as 728 and 732, whereafter unnecessary nodes and links are deleted between the nodes. Thus, nodes 714, 716 and links, i.e. connections 718, 720, 722, 724 are deleted. In modification it is also possible to create new links between the nodes. In FIG. 7B, 734 and 736 represent new links.

In block 404, one or more division criteria for signal classes are determined for dividing the signals or the signal components. The signal classes can still be divided into subclasses. Thus the signal classes constitute a hierarchic signal class system, which comprises several levels. The basic principle of the method is the same irrespective of whether the signal classes have subclasses or not.

A division criterion for signal classes may be, for instance, a transmission or reception antenna beam, i.e. the signals transmitted from or received in the same antenna beam are determined to belong to the same signal class, or a subcarrier of the OFDM (Orthogonal Frequency Division Multiplexing) system, i.e. the signals intended for the same subcarrier are determined to belong to the same signal class. Other signal class division criteria include, for instance, a spreading ratio or a spreading code, a modulation method, a service quality class, cutting of power level, a standard used at a radio interface or a carrier. Division criteria for signal classes may also be the following: signals with different modulation accuracy requirements are divided into different signal classes, signals are divided into different signal classes after spatial, temporal and/or frequency-level pre-processing, or signals are divided into different signal classes after interference cancellation pre-processing.

Requirements for modulation accuracy refer to various parameters representing the quality of the radio-frequency operation of the system, such as EVM (Error Vector Magnitude), which refers to a vector representing distance between a noisefree symbol location and the actual symbol location, when interference is summed in the modulated signal. The error vector is one prior art criterion for the quality of modulation. Another parameter representing the requirements for modulation accuracy is the maximum value of a peak code domain error, which is used in the WCDMA systems and which represents an error due to modulation inaccuracy in the despread signal. Other optional parameters include a frequency error and a phase error, for instance.

Distribution of signals to different antenna beams in beam forming can be given as an example of spatial preprocessing. Temporal pre-processing is, for instance, channel equalization, which can be implemented by means of signal classes for instance as follows: radio resource users are divided into signal classes on the basis of the data speeds of the links and the channel equalization is performed only on the signals of the highest data speed. In that case resources are saved, because the channel equalization is only performed on the signals that benefit most thereof. Preprocessing that cancels interference can be implemented signal-classwise for instance as follows: the signal that interferes worst is detected first, it is modulated and subtracted from the received signal, next is detected the signal that interferes next worst and so on and so forth, until all the desired signals are detected.

Division criteria for signal classes may be one or more class-specifically, and if necessary, the division criteria may also be altered. The division criteria for signal classes vary application-specifically.

In block 406, at least one of the signals or the signal components is divided according to one or more division criteria for signal classes. The following is an example of using a modulation method as a division criterion: in HSDPA (High Speed Downlink Packet Access) systems baseband nodes forward signals intended for the same antenna and the same carrier divided into two signal classes, of which the QPSK (Quadrature Phase-Shift Keying) modulated signals are in one class and the 16QAM or 64QAM modulated signals are in the other class. So the signals in different signal classes can be modulated separately. Optionally, the signal is despread and the next operation, for instance cutting of power level, is performed on the sum signal. The cutting of power level refers in this connection to a method, by which the relation of the signal peak power and the average power is reduced and/or the peak power is lowered.

Apart from classes, the signals can also be divided into sub-classes, i.e. for instance such that first the signals are divided according to the modulation method, whereafter the modulation classes are divided into sub-classes on the basis of the service quality class, for instance. Thus the signal classes constitute a hierarchic signal class system which comprises a plurality of levels.

In block 408, predetermined operations are performed in the nodes of the circuit arrangement signal-classwise. The operations typically include various tasks of radio frequency parts or baseband parts of a radio transmitter or receiver, such as frequency change, modulation and power level adjustment of the signal.

Division of signals into different classes-can also be utilized in monitoring the network traffic load. For instance, if the transmission power exceeds a predetermined threshold value determined for a signal class, the power level of the signals in that class is lowered or the signals are not transmitted until the traffic load on the radio path reduces sufficiently. In reception, in turn, the power of the received signal can be determined signal-classwise.

Because signal processing may affect the quality of the signals, at least in some cases feedback information is needed for process control. Thus it is often advantageous if the circuit arrangement enables feedback information transfer, i.e. data transfer links between desired nodes are bidirectional. The bidirectional links can also be utilized in the above-described monitoring of network traffic load.

Each inter-node link has a maximum transfer capacity, within which the number and type of the signal classes to be transferred can be altered. Different signal classes may comprise signals that are intended for the same carrier, i.e. the different classes may comprise signals intended for the same antenna, or the different classes include signals intended for different antennas.

The nodes may unicast or multicast. The node transmission mode can be changed by means of control. Particularly in the uplink, transferring signal classes from one radio-frequency node to a plurality of baseband nodes, i.e. copying, is advantageous in many cases when a broadband radio system is concerned. The copying operation is typically repeated in the course of the transfer, i.e. in packet transmission, for instance, several consecutive packets are copied and transferred to a plurality of nodes of the next level. When data is transmitted to a plurality of nodes of the next level, the frequently applied term is multicast transmission. When data is transmitted from the node to one or more nodes of the next level, the frequently applied term is broadcast transmission. If data is transferred to only one node of the next level, the term used is unicast transmission.

The method ends in node 410. Arrow 412 indicates the repeatability of the method, for instance, such that signals are first classified in one manner for a particular operation, whereafter the signals are classified for another operation either in the same manner or in a different manner, depending on the operation. It should be noted that when the method is applied, all the signals need not necessarily be classified, but the classified signals are selected according to each particular operation, and thus the number of signals to be classified varies.

Next, signal processing will be described in greater detail signal-classwise, using a signal summing operation as an example. A signal class is formed, for instance, of signals that are intended for the same antenna and the same carrier. In summing the signals in the downlink, the baseband nodes form sum signals of similar signal classes. In the node the signal classes of the same type are summed and the node output is one sum signal class, not a plurality of individual signal classes.

Next will be described in greater detail two examples of a circuit arrangement, to which the method of the invention can be applied. One exemplary circuit arrangement is at least substantially in accordance with the combined tree structure such that at least one tree branch performs transmitter tasks and at least one other branch performs receiver tasks, and in which circuit arrangement one or more nodes of different branches is connected in a predetermined manner. Naturally, the combined tree structure can be implemented in a variety of ways. One example of this structure is shown in FIG. 5. Nodes 502 to 508 form a first subtree and nodes 510 to 516 a second subtree. Both subtrees are connected to a so-called zero node 500. In a base station, which is implemented by means of the structure shown in the figure, typically one tree branch performs the tasks of a transmitter and the second branch performs the tasks of a receiver. Nodes 504, 514, 506, 512 are data transfer nodes, through which desired information can be conveyed from one tree branch to the other, for instance, information between the transmitter and the receiver, via links 534, 536. Other links between nodes have been indicated by reference numerals 518, 520, 522, 524, 526, 528, 530, 532.

The circuit arrangement also comprises a control unit 534, which controls the division into signal classes. If a base station is concerned, the control unit may be located in the base station, a base station controller or a radio network controller. The control unit is typically implemented by means of software, for instance, as an ASIC or a similar solution.

Another advantageous architectural structure that can be applied in the implementation of the invention is a loop structure. The loop structures can be implemented in a variety of ways. One example of this structure is shown in FIG. 6. In the base station, which is implemented in the manner shown in FIG. 6, at least two subtrees are typically connected to the loop, of which subtrees one performs the tasks of the radio-frequency parts and the other performs the tasks of the baseband parts. Thus, for instance, nodes 600, 606 perform the tasks of the radio-frequency parts and nodes 608, 614 perform the tasks of the baseband parts. Nodes 602, 604, 610, 612 are data transfer nodes and they are responsible for data transfer from one node to the other. Inter-node links are indicated by reference numerals 616, 618, 620, 622, 624, 626, 628.

The circuit arrangement also comprises a control unit 534, which controls the division into signal classes. If a base station is concerned, the control unit may be located in the base station, a base station controller or a radio network controller. The control unit is typically implemented by means of software, for instance, as an ASIC or a similar solution.

Apart from the tree model or the loop model, the circuit arrangement can be implemented in a variety of ways, for instance, by combining these two methods in a suitable manner.

Even though the invention is described in the above with reference to the example of the accompanying drawings, it is apparent that the invention is not restricted thereto but it can be modified in a variety of ways within the scope of the inventive idea disclosed in the attached claims.

The invention claimed is:

1. A method comprising:
   first determining for different nodes of a circuit arrangement one or more predetermined operations to execute;
   second determining one or more division criteria for dividing signals or signal components into signal classes;
   dividing at least one of the signals or signal components according to the one or more division criteria into the signal classes; and
   executing the predetermined operations in the circuit arrangement nodes according to the signal classes,
   wherein the circuit arrangement is at least substantially in accordance with a combined tree structure comprising at least one first tree branch configured to perform transmitter tasks and at least one second tree branch configured to receive receiver tasks, and wherein the circuit arrangement comprises one or more nodes of different branches connected in a predetermined manner.

2. The method of claim 1, wherein the signals or the signal components transfer packet-form data and the signal classes are indicated in a packet header.

3. The method of claim 1, wherein the nodes perform tasks of radio-frequency parts or baseband parts.

4. The method of claim 1, wherein the circuit arrangement is configured to transfer feedback information.

5. The method of claim 1, wherein said signals comprise signals to be modulated in different manners in one or more baseband nodes, wherein the modulated signals are divided into different signal classes.

6. The method of claim 1, wherein data can be transmitted from the nodes in unicast to one node or in multicast or broadcast to a plurality of nodes.

7. The method of claim 1, wherein network traffic load is monitored according to the signal classes.

8. The method of claim 1, wherein the signal classes constitute a hierarchic signal class system comprising one or more levels.

9. The method of claim 1, wherein inter-node links have a maximum capacity, wherein number and type of the transmitted signal classes can be altered.

10. The method of claim 1, wherein the signals are categorized into predetermined quality classes, and the quality classes of the signals are taken into account when the signal is clipped.

11. The method of claim 1, wherein the signals are divided into quality classes and signal power is measured in each of the quality classes.

12. The method of claim 1, wherein the signals having different requirements for modulation accuracy are divided into different signal classes.

13. The method of claim 1, wherein the signals are divided into different signal classes after at least one of spatial, temporal or frequency-level pre-processing.

14. The method of claim 1, wherein the signals are divided into different signal classes after interference cancellation pre-processing.

15. A method comprising:
   first determining for different circuit arrangement nodes at least one operation to execute and selecting a modification level from the circuit arrangement;
   merging together nodes in the selected modification level and deleting irrelevant nodes and links between the nodes and/or adding new links;
   second determining one or more division criteria for dividing the signals or signal components into signal classes;
   dividing at least one of the signals or signal components according to the one or more division criteria into the signal classes; and
   executing the determined operations in the circuit arrangement nodes according to the signal classes.

16. A method comprising:
   first determining for different nodes of a circuit arrangement one or more predetermined operations to execute;
   second determining one or more division criteria for dividing signals or signal components into signal classes;
   dividing at least one of the signals or signal components according to the one or more division criteria into the signal classes; and
   executing the predetermined operations in the circuit arrangement nodes according to the signal classes,
   wherein the circuit arrangement is at least substantially in accordance with a centralized loop such that at least two subtrees are connected to the centralized loop, wherein at least one subtree performs tasks of radio-frequency parts and at least one second subtree performs tasks of baseband parts.

17. The method of claim 16, wherein the signals or the signal components transfer packet-form data and the signal classes are indicated in a packet header.

18. The method of claim 16, wherein the nodes perform tasks of radio-frequency parts or baseband parts.

19. The method of claim 16, wherein the circuit arrangement is configured to transfer feedback information.

20. The method of claim 16, wherein said signals comprise signals to be modulated in different manners in one or more baseband nodes, wherein the modulated signals are divided into different signal classes.

21. The method of claim 16, wherein data can be transmitted from the nodes in unicast to one node or in multicast or broadcast to a plurality of nodes.

22. The method of claim 16, wherein network traffic load is monitored according to the signal classes.

23. The method of claim 16, wherein the signal classes constitute a hierarchic signal class system comprising one or more levels.

24. The method of claim 16, wherein inter-node links have a maximum capacity, wherein number and type of the transmitted signal classes can be altered.

25. The method of claim 16, wherein the signals are categorized into predetermined quality classes, and the quality classes of the signals are taken into account when the signal is clipped.

26. The method of claim 16, wherein the signals are divided into quality classes and signal power is measured in each of the quality classes.

27. The method of claim 16, wherein the signals having different requirements for modulation accuracy are divided into different signal classes.

28. The method of claim 16, wherein the signals are divided into different signal classes after at least one of spatial, temporal or frequency-level pre-processing.

29. The method of claim 16, wherein the signals are divided into different signal classes after interference cancellation pre-processing.

30. An apparatus comprising:
   nodes arranged to perform at least one operation;
   a divider configured to divide one or more signals or signal components according to one or more predetermined division criteria into signal classes; and
   performing circuitry configured to perform predetermined operations according to the signal classes,
   wherein the apparatus is configured substantially in a combined tree structure comprising, at least one first tree branch configured to perform transmitter tasks and at least one second tree branch configured to perform receiver tasks, and wherein the combined tree structure comprises one or more nodes of different branches connected in a predetermined manner.

31. The apparatus of claim 30, wherein the signals or the signal components transfer packet-form data and the signal classes are indicated in the packet header.

32. The apparatus of claim 30, wherein the nodes perform tasks of radio-frequency parts or baseband parts.

33. The apparatus of claim 30 further comprising a transmitter configured to transfer feedback information.

34. The apparatus of claim 30, wherein the divider is further configured to divide the signals to be modulated in different manners into different signal classes.

35. The apparatus of claim 30, further comprising a transmitter configured to transmit data from the nodes to one node or a plurality of nodes.

36. The apparatus as claimed in claim 30, further comprising a monitor configured to monitor network traffic load according to the signal classes.

37. The apparatus of claim 30, wherein the signal classes constitute a hierarchic signal class system comprising one or more levels.

38. The apparatus of claim 30, wherein links between the nodes have a maximum transfer capacity, wherein a number and a type of the transferred signal classes can be altered.

39. The apparatus of claim 30, wherein the signals are divided into predetermined quality classes, and wherein the apparatus further comprise an accounting circuitry configured to take into account the quality classes when one of the signals is clipped.

40. The apparatus of claim 30, wherein the divider is further configured to divide the signals into predetermined quality classes and measuring signal power in each of the quality classes.

41. The apparatus of claim 30, further comprising a controller configured to control the division into signal classes.

42. The apparatus of claim 30, wherein the divider is further configured to divide signals having different requirements for modulation accuracy into different signal classes.

43. The apparatus of claim 30, wherein the divider is further configured to divide the signals into different signal classes after at least one of spatial, temporal or frequency-level pre-processing.

44. The apparatus of claim 30, wherein the divider is further configured to divide the signals into different signal classes after interference cancellation pre-processing.

45. An apparatus comprising:
nodes arranged to perform at least one operation;
a divider configured to divide one or more signals or signal components according to one or more predetermined division criteria into signal classes; and
performing circuitry configured to perform predetermined operations according to the signal classes,
wherein the apparatus is configured substantially in a centralized loop such that at least two subtrees are connected to the centralized loop, wherein at least one first subtree performs tasks of radio-frequency parts and at least one second subtree performs tasks of baseband parts.

46. The apparatus of claim 45, wherein the signals or the signal components transfer packet-form data and the signal classes are indicated in the packet header.

47. The apparatus of claim 45, wherein the nodes perform tasks of radio-frequency parts or baseband parts.

48. The apparatus of claim 45 further comprising a transmitter configured to transfer feedback information.

49. The apparatus of claim 45, wherein the divider is further configured to divide the signals to be modulated in different manners into different signal classes.

50. The apparatus of claim 45, further comprising a transmitter configured to transmit data from the nodes to one node or a plurality of nodes.

51. The apparatus as claimed in claim 45, further comprising a monitor configured to monitor network traffic load according to the signal classes.

52. The apparatus of claim 45, wherein the signal classes constitute a hierarchic signal class system comprising one or more levels.

53. The apparatus of claim 45, wherein links between the nodes have a maximum transfer capacity, wherein a number and a type of the transferred signal classes can be altered.

54. The apparatus of claim 45, wherein the signals are categorized into predetermined quality classes, and wherein the apparatus further comprises an accounting circuitry configured to take into account the quality classes when one of the signals is clipped.

55. The apparatus of claim 45, further comprising a measurer configured to measure signal power, wherein the signals are divided into quality classes and the signal power is measured in each of the quality classes.

56. The apparatus of claim 45, further comprising a controller configured to control the division into signal classes.

57. The apparatus of claim 45, wherein the divider is further configured to divide signals having different requirements for modulation accuracy into different signal classes.

58. The apparatus of claim 45, wherein the divider is further configured to divide the signals into different signal classes after at least one of spatial, temporal or frequency-level pre-processing.

59. The apparatus of claim 45, wherein the divider is further configured to divide the signals into different signal classes after interference cancellation pre-processing.

60. A computer program embodied on a computer readable storage medium, the computer readable storage medium storing code comprising computer executable instructions, the computer readable storage medium being non-transitory and comprising:
first determining for different nodes of a circuit arrangement one or more predetermined operations to execute;
second determining one or more division criteria for dividing signals or signal components into signal classes;
dividing at least one of the signals or signal components according to the one or more division criteria for the signal classes; and
executing the predetermined operations in the circuit arrangement nodes according to the signal classes,
wherein the circuit arrangement is at least substantially in accordance with either
a combined tree structure comprising at least one tree branch configured to perform transmitter tasks and at least one second tree branch configured to perform receiver tasks, and wherein the circuit arrangement comprises one or more nodes of different branches connected in a predetermined manner; or
a centralized loop such that at least two subtrees are connected to the centralized loop, wherein at least one subtree performs tasks of radio-frequency parts and at least one second subtree performs tasks of baseband parts.

* * * * *